United States Patent [19]
Pletcher et al.

[11] Patent Number: 4,658,491
[45] Date of Patent: Apr. 21, 1987

[54] METHOD OF MAKING A CORROSION PROOF MULTI-PIECE HOUSING

[76] Inventors: Gary Pletcher, 18 W. Sixth St., Lansdale, Pa. 19446; Robert C. Henderson, 580 Jacksonville Rd., Ivyland, Pa. 18974; Robert Tiley, 68 Winding La., Feasterville, Pa. 19047; Michael J. Cesaro, 104 Gerstley Rd., Hatboro, Pa. 19040

[21] Appl. No.: 750,296

[22] Filed: Jul. 1, 1985

[51] Int. Cl.⁴ .................. B23P 17/00; F16L 11/12
[52] U.S. Cl. .................................. 29/423; 285/45
[58] Field of Search .............. 285/45; 427/435, 379, 427/380, 390, 397, 398, 391, 432–434; 29/413, 418, 423, 460

[56] References Cited

U.S. PATENT DOCUMENTS

| | | | |
|---|---|---|---|
| 2,544,108 | 3/1951 | Richardsen | 29/413 |
| 2,907,351 | 10/1959 | Rohrback et al. | 285/45 |
| 2,978,533 | 4/1961 | Colbert | 285/45 |
| 3,434,900 | 3/1969 | Bender | 285/45 |
| 3,535,136 | 10/1970 | Beene | 285/45 |
| 3,675,950 | 7/1972 | Beene | 285/45 |

*Primary Examiner*—Howard N. Goldberg
*Assistant Examiner*—Steven Nichols
*Attorney, Agent, or Firm*—Woodcock Washburn Kurtz Mackiewicz & Norris

[57] ABSTRACT

An improved method for coating multi-piece explosion-proof housings with a corrosion-resistant material which permits assembly and disassembly without interference with the corrosion-proofing function of the coating is disclosed. The method features assembly of the portions of the housing together with spacer means and dipping or otherwise coating the housing portions with a corrosion-resistant material. The spacer is formed in order to cause seal members to be formed directly in the coating which are brought into compression with one another upon subsequent assembly of the housing without the spacer so that an effective seal is provided.

3 Claims, 8 Drawing Figures

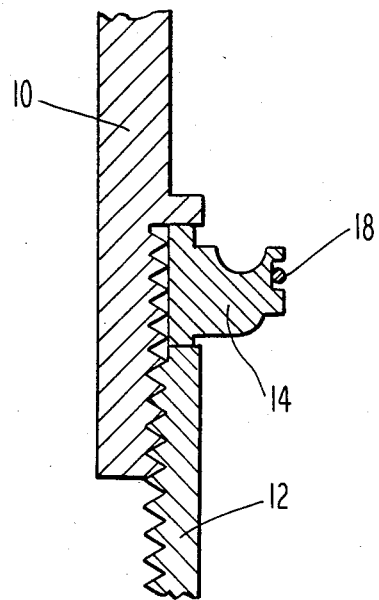
_Fig. 3_
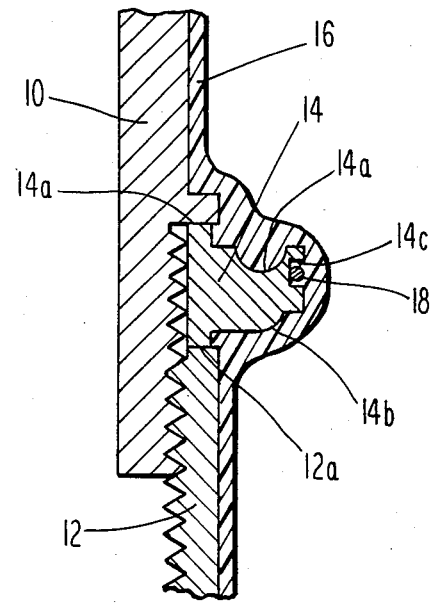
_Fig. 4_
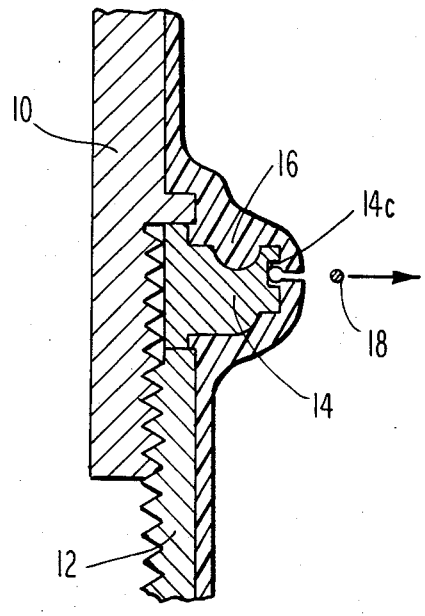
_Fig. 5_
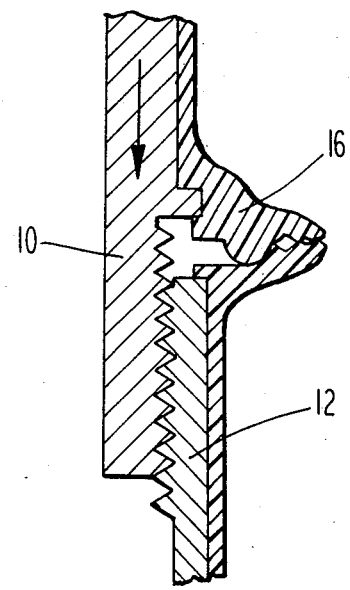
_Fig. 6_

METHOD OF MAKING A CORROSION PROOF MULTI-PIECE HOUSING

FIELD OF THE INVENTION

This invention relates to a corrosion proof multi-piece housing. More particularly, the invention relates to a corrosion-proof metallic housing which is fabricated in such a way that complete corrosion proofing is provided while permitting repeated opening and reclosing of the container.

BACKGROUND OF THE INVENTION

It is commonplace in processing industries to require that electronic and other control equipment be enclosed in explosion-proof housings. Typically, these housings are formed of aluminum or steel materials and are formed with a lengthy or labyrinthine path between the various parts making up the housing so as to provide a long escape path for hot gases generated within the housing due to an explosion, so that the gases are cooled by the time they reach the outside of the container, thus preventing ignition of any combustible materials outside the housing.

Frequently these housings are intended to be used in corrosive atmospheres, such that their materials are subject to chemical attack. Of course, it would be possible to make the housings out of metals which resist chemical attack, but these refractory metals are very difficult to fabricate; while plastic materials are insufficiently strong. Accordingly, the art requires a corrosion-proof, explosion-proof housing. This requires that the entire exterior surface of the housing be provided with a coating of a corrosion-resistant material. Many plastics are suitable for this purpose. However, a further requirement is that it be possible to open the housing repeatedly for inspection, maintenance and repair of the equipment carried therein, and that the corrosion-proofing coating retain its integrity after re-assembly of the housing without having to again corrosion-proof the housing, e.g. by recoating the completed housing, which would be extremely inconvenient. Similarly, of course, the plastic coating cannot be permitted to interfere with the explosion-proof nature of the housing.

The prior art shows no suitable way of fabricating a corrosion-proof housing which can be disassembled and reassembled without destruction of the coating. Beene U.S. Pat. No. 3,535,136 shows a method for joining two pieces of threaded conduit which provides a continuous corrosion-proof coating thereon. This involves fabrication of a coating in such a way that a male portion of the corrosion-resisting coating on one piece of the conduit extends into a female portion of the coating on the other conduit member, and is in compression therewith upon assembly. This approach is effective but would be very difficult to fabricate because of the complex shapes required. In particular, this method is not amenable to coating by dipping, which is much the most practical way of coating such things as housings, particularly the irregularly shaped housing which are frequently of use. The difficulty with corrosion-proofing housings by dipping the complete housing is that access must be provided to the interior of the housing. A complete housing can be separated into its components after dipping by simply cutting along a join line, generally in the vicinity of the parting line between the two or more portions of the housing. However, such a cut will inevitably leave a gap through which corrosive gases and the like can enter, thus rendering the assembly non-corrosion-proof; furthermore, the portions will ordinarily not be interchangeable.

OBJECT OF THE INVENTION

Accordingly, it is an object of the invention to provide an improved corrosion-proof housing.

It is a further object of the invention to provide an improved corrosion-proof and explosion-proof housing, understanding the term "explosion-proof" as typically used in the art.

It is a further object of the invention to provide an improved corrosion-proof housing in which the corrosion-proofing can be accomplished by convenient methods, typically by dipping the housing into a bath of a plastic material.

It is a further object of the invention to provide a method for corrosion-proofing a housing which is simple of application, yet which provides a corrosion-proof housing which can be assembled and disassembled repeatedly without destroying the corrosion-proofing, and in which the portions of several housings can be interchanged.

It is a further object of the invention to provide a corrosion-proofing method which is applicable to housings which are assembled by threads formed on the housing members themselves or by bolting them together.

SUMMARY OF THE INVENTION

The above needs of the art and objects of the invention are satisfied by the present invention which comprises a method for coating multi-part housings formed of corrosion-susceptible materials in such a way that the housing may be disassembled repeatedly and reassembled while maintaining the integrity of the corrosion-resistant coating. The method involves assembling the parts of the multi-piece housing with spacers therebetween. The assembly, including the spacers, is then dipped in the corrosion-resistant material. After dipping, the spacer is removed. The spacer has shapes molded into its surfaces perpendicular to the direction of assembly of the multiple pieces of the housing, which cause an interference fit to be formed between portions of the corrosion-resistant coating upon subsequent assembly of the coated housing members without the spacer. Typically a tongue-and-groove joint may be provided. The coating on the housing may be divided into a number of portions equal to the number of pieces of the multi-part housing by pulling wires, disposed in grooves around the outer peripheries of the spacers during the dipping process, out of the grooves, thus cutting the coating. When the portions of the housing are subsequently assembled without the spacer, the portions of the corrosion-proof coating are forced into an interference fit with one another, which forms a very positive and durable seal which may be disassembled and reassembled many times without destroying its integrity.

BRIEF DESCRIPTION OF THE DRAWINGS

The invention will be better understood if reference is made to the accompanying drawings, in which:

FIGS. 3, 4, 5, and 6 show cross-sectional views of stages in the method of manufacture of the corrosion-proof multi-piece housing of the invention, all taken generally along the line 4—4 of FIG. 2.

DESCRIPTION OF THE PREFERRED EMBODIMENTS

As mentioned above, the primary goal of the invention is to provide a corrosion-resistant multi-piece housing which is completely coated against corrosion and which may be disassembled and reassembled many times without destruction of the efficacy of the corrosion-proofing. The solution adopted according to the invention is to provide portions of the corrosion-resistant coating which are in compression when the portions of the housing are assembled. The invention furthermore provides a simple and efficient way of forming such a corrosion-resistant housing.

Figure 1:
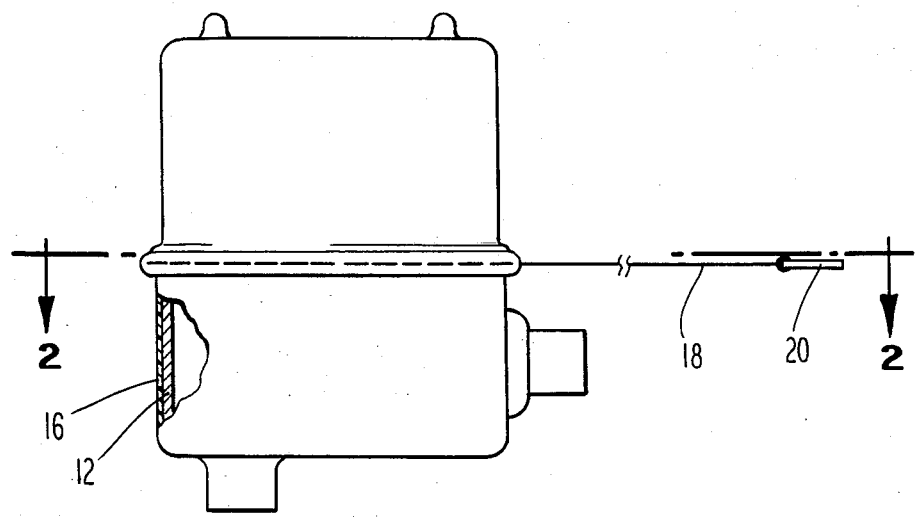
FIG. 1 shows an overall view of the coated housing prior to cutting of the coating and removal of the spacer therefrom.
Figure 2:
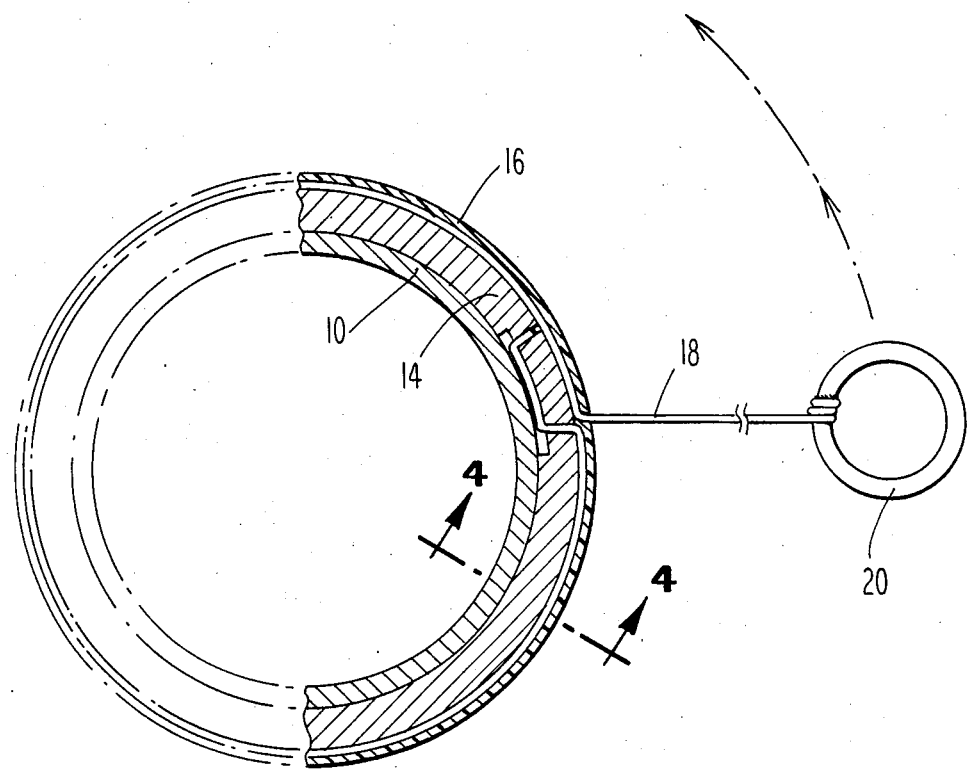
FIG. 2 shows a cross-section taken along the line 2—2 of FIG. 1.

FIG. 1 shows the assembled housing having been coated by dipping; FIG. 2 is a cross section taken along the line 2—2 of FIG. 1; and FIGS. 3-6, cross-sections taken along the line 4—4 of FIG. 2 show the sequence of steps in the process. If reference is made simultaneously to all these figures, the process will be well understood. The housing comprises two portions 10 and 12 of a corrosion-susceptible metallic material such as iron, aluminum or steel. They are assembled prior to dipping with a third spacer member 14 which may be also formed of aluminum, steel or the equivalent. The spacer is designed to ensure that a coating 16 applied over the entire assembly in a dipping operation extends beyond what would otherwise be the mating surfaces 10a and 12a of the housing, such that the coating is in compression when the two halves 10 and 12 of the housing are subsequently assembled without the spacer 14 therebetween.

As most clearly seen in FIG. 4, the spacer has formed into it shapes 14a and 14b which cause complementary shapes to be molded into the coating 16 during the dipping operation. As shown, these may be tongue-and-groove shapes; others are of course possible. The assembly of FIG. 1 is completed by a wire 18 which fits in a groove 14c around the periphery of the spacer 14 and is retained therein as shown in FIG. 2. Other methods of retention are of course possible. A pull ring 20 may be attached to the extremity of the wire 18.

FIGS. 3-6 show the sequence of steps in the method according to the invention. FIG. 3 shows the assembly of the upper portion of the housing 10, the lower portion 12, the spacer 14, and the wire 18. FIG. 4 shows this assembly having been dipped; as shown, the coating 16, which may be of any suitable plastic, such as polyvinylchloride or the like, covers the entire assembly. Obviously in this state, the housing is corrosion-proof as the polyvinylchloride plastic coats the entire assembly. The difficulty, of course, is to provide some means for separation of the upper and lower halves 10 and 12, while ensuring that the integrity of the coating is reestablished upon reassembly.

FIG. 5 shows how this may be accomplished. The pull ring 20 (FIG. 2) is pulled, pulling the wire 18 outwardly, as shown in FIG. 5, creating a cut in the polyvinyl chloride plastic coating 16. When the plastic is cut all the way around the periphery of the housing, the two halves 10 and 12 may be unscrewed from one another and separated. Upon reassembly without the spacer 14, as shown in FIG. 6, the tongue and groove formed in the polyvinyl chloride plastic by the shapes 14a and 14b formed in the spacer (FIG. 4) fit together. They are in compression with one another as, in effect, they control the spacing of the two halves of the housing 10 and 12 upon assembly, and thus form a good seal. The gap or cut left by the wire 18 upon its removal, as long as its width is less than the thickness of the spacer 14, is not of consequence, as it would be in a system in which the mating tongue and groove portions of the plastic coating 16 were not in compression with one another. It will be appreciated further that the cut is made outside of the seal area, so that the seal is not susceptible to damage in the cutting operation and so that the portions of the housing are interchangeable. Disassembly and reassembly of the assembly shown in FIG. 6 can be performed many times without damaging the seal made by the two halves of the plastic coating 16. Moreover, the fact that the coating is formed in a radially symmetric manner means that the relative radial positioning of the two halves is of no consequence; similarly, if the plastic wears somewhat over time, the container can simply be tightened down further, thus ensuring that a good seal is effected and corrosion-proofing is maintained.

It will further be appreciated that the shape shown in FIG. 6 of the outer periphery of the coating may further actually increase the explosion-proof nature of the housing by increasing the distance along which any explosive gases would have to travel before reaching an external atmosphere and hence further reducing their temperature.

It will also be appreciated that the shape formed in the plastic coating, being generally of tongue-in-groove shape, augments the seal by increasing the compression at a specific location on the seal, as opposed to a seal, for example, formed between two mating flat pieces which would be of relatively low specific loading. The seal according to the invention is very highly compressed at its mating portions and hence is of good integrity.

Figure 7:
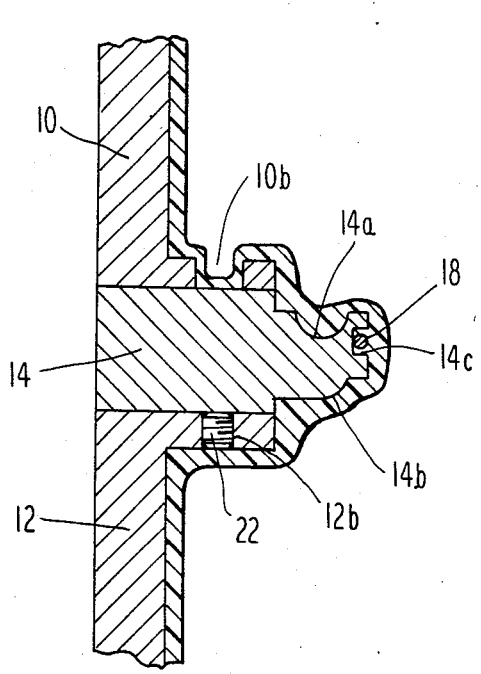
FIGS. 7 and 8 show views comparable to FIGS. 4 and 6 of an alternative embodiment of the invention.
Figure 8:
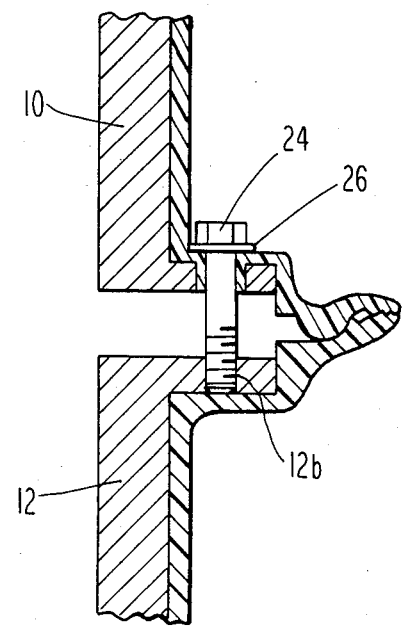

FIGS. 7 and 8 show a second embodiment of the invention in which the housing is held together by bolted flanges rather than by having the two parts of the housing being threaded into one another. Again, the preliminary assembly shown in FIG. 7 is made and dipped. The assembly comprises an upper portion of the housing 10, a lower portion 12, an intervening spacer 14 having tongue-in-groove shapes 14a and 14b and a groove 14c formed therein. A wire 18 rides in the groove 14c. In this case, however, one flange is formed with a straight bore 10b for insertion of a bolt, and the other is threaded at 12b. In order that the threads 12b are not filled by the plastic upon dipping, a suitable threaded insert 22 which may simply be a set screw or the like is inserted in the threads prior to the dipping assembly. Of course, it would also be possible to use bolts which are bolted to nuts rather than being threaded directly into threads formed in one of the flanges. In such case, threads on the hole 12b and the insert 22 could be eliminated. After dipping, cutting of the plastic coating by pulling the wire 18 out of the groove 14c, and removal of the spacer, the assembly can be made as shown in FIG. 8. Bolts 24 are repeated as needed around the periphery of the housing. Washers 26 spread the loading of the bolt head over a greater area of the plastic to prevent undue compression and also to prevent tearing of the plastic upon turning of the bolt 24 for tightening it. A disk of the plastic coating material at the bottom of bore 10*b* is removed before insertion of the bolt. In other respects, the assembly is generally as shown with respect to FIGS. 3–6.

It will be appreciated that the structure discussed in connection with FIG. 7 provides corrosion resistance even of the walls of the bore 10*b* within which the bolt 24 fits. The other end of the hole within which the bolt fits is covered completely by the coating as shown in FIG. 8. Accordingly, the only part of the structure which would be exposed to corrosion material is the head of the bolt 24; the bolt can readily be replaced upon disassembly and reassembly of the housing if necessary.

Another possibility would be to provide a plate closing off the interior of each half of the housing prior to dipping. In such case the portions of the housing would be dipped separately, not as an assembly with a spacer therebetween. The plastic, however, would continue to extend beyond the plane in which the portions of the housing mate after assembly so that seal portions formed of the coating would be in compression upon their assembly. The peripheries of the plate could similarly be formed to provide specific desired seal shapes such as the tongue-in-groove shape shown in connection with the previous embodiments.

Thus, while a number of preferred embodiments have been shown and described, the invention should not be limited thereby but only by the following claims.

I claim:

1. A method of manufacture of a corrosion-resistant housing comprising the steps of assembling multiple corrosion-susceptible pieces of said housing together with spacer means, said spacer means spacing said pieces of said housing a distance further apart then if assembled without said spacer means, coating this assembly with a corrosion-resistant material, cutting said corrosion-resistant coating apart in a cutting operation such that the width of the cut is less than said distance, and removing said spacer therefrom, whereby upon assembly of said coated housing pieces together without said spacer, portions of said coating in the vicinity of said spacer are brought into compression with one another whereby an effective seal is formed therebetween.

2. The method of claim 1 wherein said spacer is formed with a predetermined cross sectional shape extending substantially uniformly around said housing, so as to cause corresponding seal portions to be molded integrally into said coating of corrosion-resistant material, whereby upon assembly of said housing after removal of said spacer, said corresponding seal portions are urged into compression with one another.

3. The method of claim 1 further including the step of providing wire means located in a groove extending around the periphery of said spacer means prior to said coating step and providing means for removal of said wire from said groove after said coating step, in order to cut said coating apart in the vicinity of said spacer.

* * * * *